(12) United States Patent
Przygodda et al.

(10) Patent No.: US 7,589,875 B2
(45) Date of Patent: Sep. 15, 2009

(54) INTENSITY PROFILE CORRECTION FOR DATA PAGES FOR HOLOGRAPHIC STORAGE

(75) Inventors: Frank Przygodda, Villingen-Schwenningen (DE); Oliver Malki, VS-Pfaffenweiler (DE); Dietmar Braeuer, Villingen-Schwenningen (DE)

(73) Assignee: Thomson Licensing, Boulogne-Billancourt (FR)

( * ) Notice: Subject to any disclaimer, the term of this patent is extended or adjusted under 35 U.S.C. 154(b) by 92 days.

(21) Appl. No.: 11/641,200

(22) Filed: Dec. 18, 2006

(65) Prior Publication Data

US 2007/0165290 A1 Jul. 19, 2007

(30) Foreign Application Priority Data

Jan. 13, 2006 (EP) .................................. 06100338
Feb. 9, 2006 (EP) .................................. 06101435

(51) Int. Cl.
*G03H 1/26* (2006.01)
*G03H 1/10* (2006.01)

(52) U.S. Cl. ......................................... 359/22; 359/10
(58) Field of Classification Search .................. 359/10, 359/11, 21, 22
See application file for complete search history.

(56) References Cited

U.S. PATENT DOCUMENTS 5,450,218 A * 9/1995 Heanue et al. ................. 359/21
6,005,693 A 12/1999 Burr et al.
2003/0063342 A1 4/2003 Horimai et al.
2003/0128324 A1 7/2003 Woods et al.

FOREIGN PATENT DOCUMENTS

EP  1 462 874 A2  9/2004

OTHER PUBLICATIONS

Search Report Dated May 23, 2006.

* cited by examiner

*Primary Examiner*—Alessandro Amari
(74) *Attorney, Agent, or Firm*—Robert D. Shedd; Jeffrey M. Navon

(57) ABSTRACT

The present invention relates to a method for recording data pages in a holographic recording medium, and more specifically to a method for compensating for sensitivity variations of the holographic material of the holographic recording medium. According to the invention, a method for recording data pages on a holographic recording medium has the steps of:

modulating a light beam with a spatial light modulator to generate a data page with data to be recorded, and applying a compensation profile to the data pages during recording for reducing contrast variations in the reconstructed data pages, wherein the compensation profile is determined from the irradiation history at the recording position and the sensitivity curve of the material of the holographic recording medium.

9 Claims, 2 Drawing Sheets

INTENSITY PROFILE CORRECTION FOR DATA PAGES FOR HOLOGRAPHIC STORAGE

FIELD OF THE INVENTION

This application claims the benefit, under 35 U.S.C. § 119 of European Patent Application 06100338.0 filed Jan. 13, 2006 and 0610145.3 filed Feb. 9, 2006.

The present invention relates to a method for recording data pages in a holographic recording medium, and more specifically to a method for compensating for sensitivity variations of the holographic material of the holographic recording medium.

BACKGROUND OF THE INVENTION

In holographic data storage the user data is usually modulated in two-dimensional data pages consisting of pixels with the binary state of either 0 or 1. In order to record data a spatial light modulator (SLM) transforms a user data pattern into an intensity modulation of an object beam. This object beam is superimposed with a reference beam, which results in an interference pattern. This pattern is recorded into a holographic storage medium, e.g. a holographic disk or card. During the reading process the reference beam (usually called probe beam) is diffracted by the interference pattern. This results in a reconstructed object beam holding the stored information. By imaging the reconstructed object beam onto a photo sensitive detector the data page is recovered.

In an optimum case the reconstructed data page has a uniform intensity profile where all regions exhibit the same pixel contrast. However, due to several reasons this is usually not the case. One reason is an inhomogeneous material sensitivity, e.g. due to the chemical properties of the employed holographic polymers. Regions already irradiated by other holograms, e.g. in the case of shift multiplexing, may have a different sensitivity than not yet irradiated regions. The difference in sensitivity depends on the sensitivity curve of the material. Because of this effect it may happen that parts of the holographic interference pattern exhibit a higher contrast than others. This results in a non uniform contrast of the recovered data page. Contrast in a region is to be understood as the difference between the mean intensity of data pixels in the state '0' and the mean intensity of data pixels in the state '1' in this region. A high contrast means that the difference is large.

For a reliable pixel detection it should be ensured that the low-contrast parts of the recovered data page are bright enough for pixel detection, whereas the high-contrast parts should not exceed the dynamic range of the detector. Furthermore, as the bright parts exhibit a higher brightness than necessary for detection, a fraction of the available beam energy is wasted.

SUMMARY OF THE INVENTION

It is an object of the invention to propose a method for recording data pages on a holographic recording medium, which is capable of compensating for sensitivity variations of the holographic material of the holographic recording medium.

According to the invention, this object is achieved by a method for recording data pages on a holographic recording medium, having the steps of:
modulating a light beam with a spatial light modulator to generate a data page with data to be recorded, and
applying a compensation profile to the data pages during recording for reducing contrast variations in the reconstructed data pages.

For this purpose, a holographic storage system, with a spatial light modulator for modulating a light beam in accordance with data to be recorded on a holographic recording medium, has a contrast variation compensator for applying a compensation profile to the data pages during recording for reducing contrast variations in the reconstructed data pages.

The invention proposes to compensate for the sensitivity variations in the holographic material during the recording process. By modulating the intensity of the SLM data page pixels in accordance with the sensitivity variations, a more uniform contrast over the entire data page is achieved during the reading process.

The relative position of regions with different sensitivity depends on the chronological and spatial history of the holograms which have already been written. This history is often called 'write schedule' or 'write strategy'. Therefore, the intensity profile applied to the data page is individually calculated for each new hologram. The necessary profile is advantageously calculated from the irradiation history and the material sensitivity curve. The irradiation history can be acquired by memorizing positions used during a writing session, or by making use of a protocol with information about used positions, which is stored on the storage medium or at another location. The sensitivity curve of the holographic material can be pre-estimated by simulations, calculations, or measurements, or directly be measured with the drive itself by writing and reading processes. The calculated profile is then applied to the data page by the SLM. For this purpose the SLM does not only switch between the states '0' and '1', but also enables grey values. By writing the holograms in this way the contrast variations in the recovered data page are largely suppressed. This results in a lower bit error rate. Alternatively, an additional SLM enabling grey values is used in combination with a binary SLM for generating the data pages. The additional SLM may have less pixels than the binary SLM, as the contrast usually varies on a larger scale compared with the pixels of the data page. In addition, the pixels of the additional SLM can be adapted to specific recurring compensation profiles, which are caused by a typical irradiation history. For example, the pixel may be parallel stripes.

Apart from the compensation of the effects caused by the inhomogeneous material sensitivity, the invention also allows to compensate for other effects which cause regions with different pixel contrast in the recovered data pages. Examples for such effects are non uniform beam intensity profiles, e.g. a Gaussian profile, or effects caused by the optical setup, as a simple optical setup may result in an inhomogeneous image. While on a single drive these effects are static for each hologram, they can vary between different drives. The method according to the invention allows to compensate for such tolerances. However, in this case the compensation profile is advantageously determined by successively writing and reading one or more test holograms, or by using the full or a part of the optical setup to image a test datapage onto the detector with or without a medium. Also a special optical setup can be used. The compensation profile is then adjusted such that a uniform contrast is achieved. The determined compensation profile is static and applied to all further holograms. For this purpose simple optical elements like specifically adapted filters may also be used. Of course, it is likewise possible to both determine a static compensation profile and calculate a dynamic compensation profile. The profiles are then combined and applied during recording.

BRIEF DESCRIPTION OF THE DRAWINGS

For a better understanding the invention shall now be explained in more detail in the following description with reference to the figures. It is understood that the invention is not limited to this exemplary embodiment and that specified features can also expediently be combined and/or modified without departing from the scope of the present invention. In the figures.

DETAILED DESCRIPTION OF PREFERRED EMBODIMENTS

Figure 1:
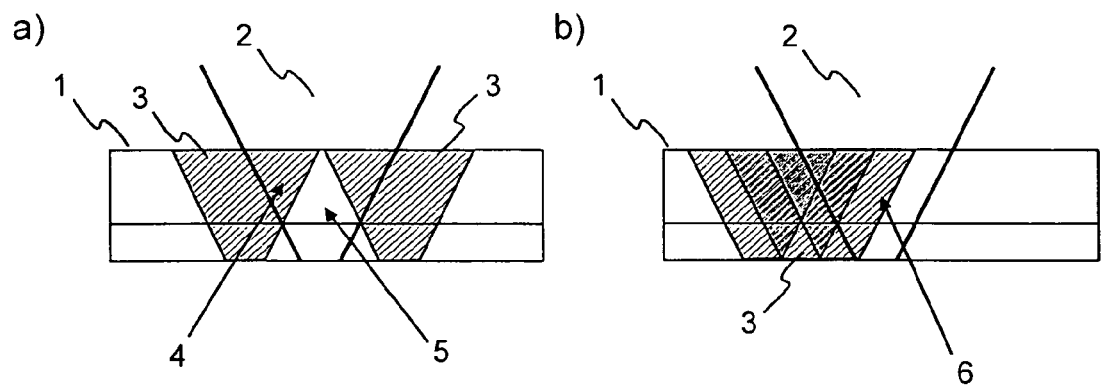
FIG. 1 shows a vertical cut through the material of a holographic recording medium having an inhomogeneous sensitivity distribution.

FIG. 1 shows a vertical cut through the material of a holographic recording medium 1. Depending on the irradiation history the material sensitivity varies in the volume of the holographic material. Two different cases are shown where the history of recorded holograms causes an inhomogeneous sensitivity distribution inside the holographic material. In FIG. 1a) the actual hologram is recorded by a recording beam 2 in between two more sensitive regions caused by previously recorded holograms 3 indicated by hashed areas. The arrow 4 indicates an area with a high sensitivity of s=1, while the arrow 5 indicates an area with a low sensitivity of s=0.5. The sensitivity values are arbitrary values used only for illustrative purposes. In FIG. 1b) a series of previously recorded holograms 3 causes steps in sensitivity in the area indicated by the arrow 6. The sensitivity steps are s=1, s=0.75, s=0.5, s=0.25, again in arbitrary values.

Figure 2:
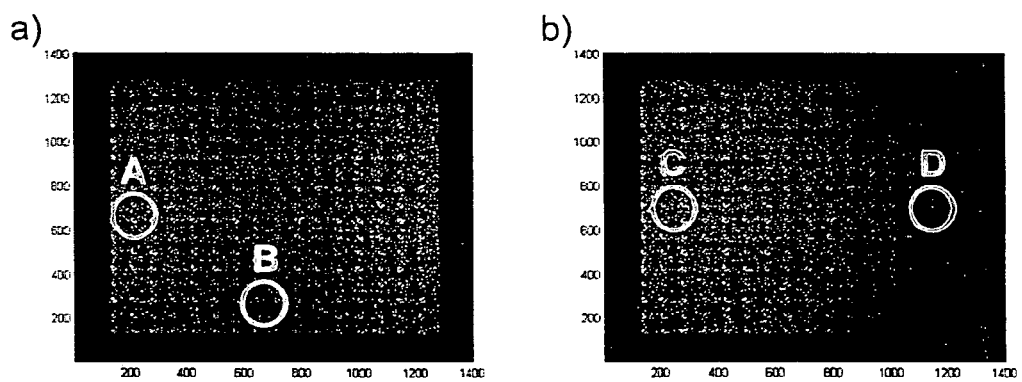
FIG. 2 shows the resulting contrast distributions within the recovered data pages.

Using the beam propagation method the effects of the above sensitivity distributions on the contrast in regions of the data pages were simulated. The resulting contrast distributions within the recovered data pages for the two examples of FIGS. 1a) and b) are illustrated in FIGS. 2a) and b), respectively. Obviously parts of the reconstructed data page exhibit a lower contrast. In FIG. 2a), in the area designated by 'A' the contrast is s=1, while in the area designated by 'B' the contrast is s=0.5. In FIG. 2b), in the area designated by 'C' the contrast is s=1, while in the area designated by 'D' the contrast is s=0.2.

Figure 3:
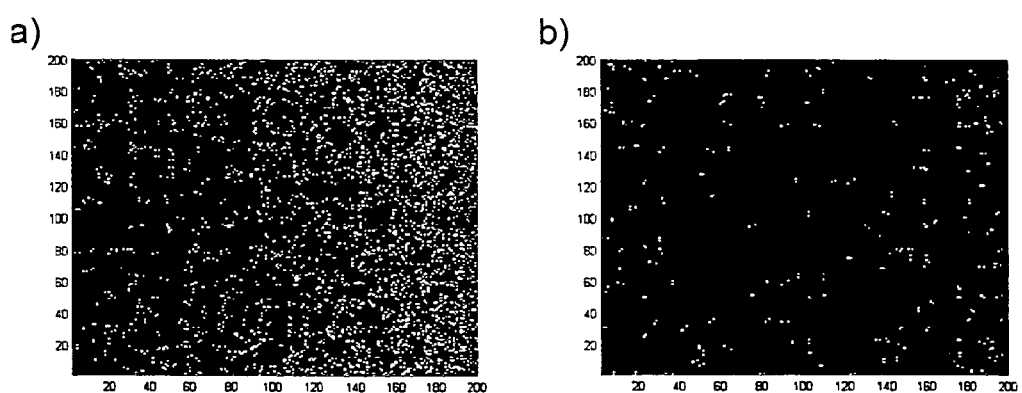
FIG. 3 shows the bit error rate resulting from the inhomogeneous situation in FIG. 1b), FIG. 4 schematically illustrates a method according to the invention.

In FIG. 3a) the bit errors resulting from the inhomogeneous situation in FIG. 1b) are shown. Wrongly detected bits are illustrated in white. FIG. 3b) shows the bit errors in the homogeneous case.

Figure 4:
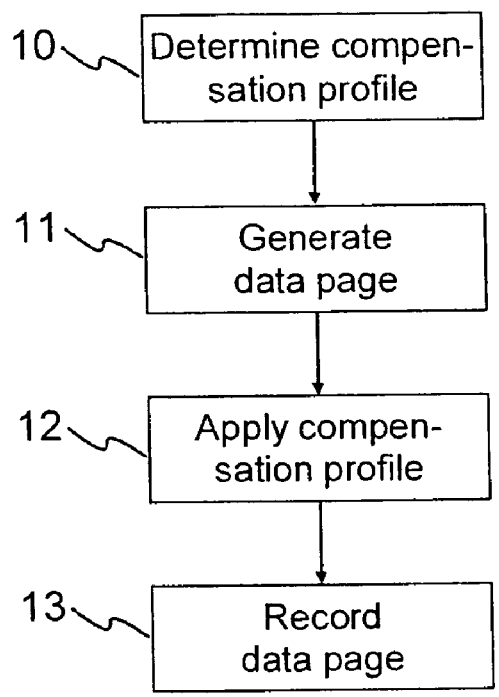

A method according to the invention is schematically illustrated in FIG. 4. Before recording a data page as a hologram on a holographic recording medium, a compensation profile is determined 20. The compensation profile takes into account static and/or position dependent contrast variations. Subsequently a data page is generated 21 by modulating a light beam with a spatial light modulator. The determined compensation profile is then applied 22 to the data page. This is done by the spatial light modulator during generation of the data page or with an additional spatial light modulator or a filter. Finally, the data page is recorded 23 on the holographic recording medium.

Figure 5:
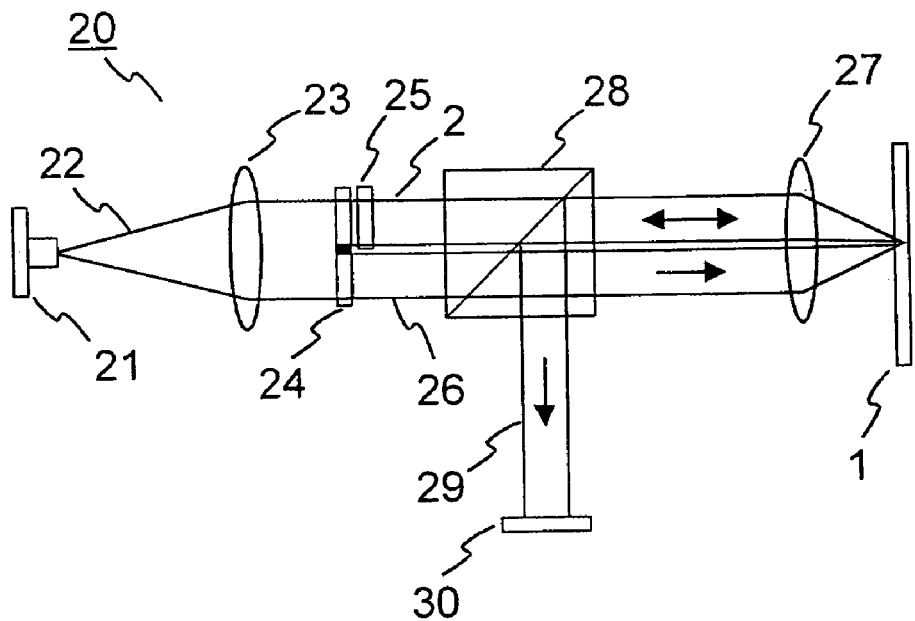
FIG. 5 depicts a holographic storage system according to the invention.

In holographic data storage digital data are stored by recording the interference pattern produced by the superposition of two coherent laser beams. In FIG. 5 an exemplary holographic storage system 20 according to the invention is depicted. Of course, the invention can likewise be implemented in other types of holographic storage systems. A source 21 of coherent light, e.g. a laser diode, emits a light beam 22, which is collimated by a collimating lens 23. The light beam 22 is then divided into two separate light beams 2, 26. In the example the division of the light beam 22 is achieved using a beam splitter 24. However, it is likewise possible to use other optical components for this purpose. A spatial light modulator (SLM) 25 modulates one of the two beams, the so called "object beam" or recording beam 2, to imprint a data page, i.e. a 2-dimensional data pattern. Both the recording beam 2 and the further beam 26, the so called "reference beam" 26, are focused into a holographic recording medium 1, e.g. a holographic disk, by an objective lens 27. At the intersection of the recording beam 2 and the reference beam 26 an interference pattern appears, which is recorded in a photo-sensitive layer of the holographic recording medium 1. During recording, the spatial light modulator 25 also applies a compensation profile to the recording beam 2. Alternatively, a compensation profile can be applied to the reference beam 26, or two both beams 2, 26, either separately or after their superposition.

The stored data are retrieved from the holographic recording medium 1 by illuminating a recorded hologram with the reference beam 26 only. The reference beam 26 is diffracted by the hologram structure and produces a copy of the original recording beam 2, the reconstructed recording beam 29. This reconstructed recording beam 29 is collimated by the objective lens 27 and directed onto a 2-dimensional array detector 30, e.g. a CCD-array, by a further beam splitter 28. The array detector 30 allows to reconstruct the recorded data.

What is claimed is:

1. Method for recording data pages on a holographic recording medium, having the steps of:
    modulating a light beam with a spatial light modulator to generate a data page with data to be recorded, and
    applying a compensation profile to the data pages during recording for reducing contrast variations in the reconstructed data pages,
    wherein the compensation profile is determined from the irradiation history at the recording position and the sensitivity curve of the material of the holographic recording medium.

2. Method according to claim 1, wherein the compensation profile is determined by successively writing and reading one or more test holograms and adjusting the compensation profile.

3. Method according to claim 1, wherein the compensation profile takes into account at least one of the profile of the light beam and contrast inhomogeneities caused by the optical setup.

4. Method according to claim 1, wherein the compensation profile is applied to the data pages by the spatial light modulator.

5. Method according to claim 4, wherein The compensation profile is applied by modulating the intensity of the pixels of the data pages.

6. Method according to claim 1, wherein the compensation profile is applied to the data pages by an additional spatial light modulator.

7. Method according to claim 1, wherein the compensation profile is applied to the data pages by a filter.

8. Holographic storage system, with a spatial light modulator for modulating a light beam in accordance with data to be recorded on a holographic recording medium, having a contrast variation compensator for applying a compensation profile to the data pages during recording for reducing contrast variations in the reconstructed data pages. wherein the compensation profile is determined by the irradiation history at the recording position and the sensitivity curve of the material of the holographic recording medium.

9. Holographic storage system according to claim 8, wherein the contrast variation compensator is the spatial light modulator, an additional spatial light modulator, or a filter.

* * * * *